US009470781B2

(12) United States Patent
Hesse (10) Patent No.: US 9,470,781 B2
(45) Date of Patent: Oct. 18, 2016

(54) RADAR DEVICE AND A METHOD FOR DETECTING A MALFUNCTION OF A RECEIVER CHANNEL OF A RADAR DEVICE (71) Applicant: Hella KGaA Hueck & Co., Lippstadt (DE)

(72) Inventor: Thomas Hesse, Paderborn (DE)

(73) Assignee: HELLA KGAA HUECK & CO., Lippstadt (DE)

(*) Notice: Subject to any disclaimer, the term of this patent is extended or adjusted under 35 U.S.C. 154(b) by 32 days.

(21) Appl. No.: 14/359,891

(22) PCT Filed: Nov. 21, 2012

(86) PCT No.: PCT/EP2012/073201
§ 371 (c)(1),
(2) Date: May 21, 2014

(87) PCT Pub. No.: WO2013/076126
PCT Pub. Date: May 30, 2013

(65) Prior Publication Data
US 2014/0340254 A1 Nov. 20, 2014

(30) Foreign Application Priority Data
Nov. 24, 2011 (DE) .................... 10 2011 055 693

(51) Int. Cl.
G01S 13/02 (2006.01)
G01S 7/40 (2006.01)
(Continued)

(52) U.S. Cl.
CPC .............. *G01S 13/02* (2013.01); *G01S 7/4008* (2013.01); *G01S 7/4021* (2013.01); *G01S 13/38* (2013.01); *G01S 13/931* (2013.01)

(58) Field of Classification Search
CPC .......... G01S 7/02; G01S 7/40; G01S 7/4004; G01S 7/4008; G01S 7/4017; G01S 7/4021; G01S 13/02; G01S 13/06; G01S 13/08; G01S 13/32; G01S 13/36; G01S 13/38; G01S 13/88; G01S 13/93; G01S 13/931; G01S 7/4052; G01S 7/4056
USPC ........ 342/27, 28, 70–72, 118, 128–133, 165, 342/173–175, 192–197
See application file for complete search history.

(56) References Cited

U.S. PATENT DOCUMENTS 325,096 A 8/1885 Leigiiton
893,125 A 7/1908 Babcock
(Continued)

FOREIGN PATENT DOCUMENTS

DE 10050278 B4 6/2005
DE 102009002143 A1 10/2010
(Continued)

*Primary Examiner* — Bernarr Gregory
(74) *Attorney, Agent, or Firm* — Husch Blackwell LLP (57) ABSTRACT A radar device for transmitting and receiving a signal in a frequency band for target detection. The invention includes a control means, an oscillator, with an input of the oscillator being connected via a converter to the control means, with it being able to address the oscillator via control means in order to generate a signal, and with it being possible to tap the signal generated via the oscillator at an output of the oscillator, at least one transmission antenna for transmitting the signals provided at the output of the oscillator, with the transmission antenna being connected to the output of the oscillator, and at least one receiver channel for receiving a receiver signal, for processing the receiver signal, and for forwarding the processed receiver signal to the control means, with the receiver channel comprising at least one receiving antenna for receiving the receiver signal and a mixer for mixing the receiver signal with the signal provided at the output of the oscillator, and with the mixer being connected to the output of the oscillator.

10 Claims, 6 Drawing Sheets (51) Int. Cl.
   *G01S 13/38*   (2006.01)
   *G01S 13/93*   (2006.01)
   G01S 13/00    (2006.01)
   G01S 7/00     (2006.01)

(56) References Cited

U.S. PATENT DOCUMENTS

| | | | | |
|---|---|---|---|---|
| 4,180,816 | A | * | 12/1979 | Endo .......................... G01S 7/40 342/70 |
| 4,245,221 | A | * | 1/1981 | Kipp ..................... G01S 7/4056 342/128 |
| 4,945,360 | A | * | 7/1990 | Trummer .............. G01S 7/4056 342/128 |
| 5,432,516 | A | * | 7/1995 | Cherry .................. G01S 7/4056 342/70 |
| 5,867,536 | A | | 2/1999 | Lyons et al. |
| 6,278,399 | B1 | * | 8/2001 | Ashihara ................... G01S 7/40 342/70 |
| 6,369,747 | B1 | * | 4/2002 | Ashihara ............... G01S 7/4004 342/165 |
| 6,414,628 | B1 | * | 7/2002 | Ashihara ................... G01S 7/40 342/173 |
| 6,825,799 | B2 | * | 11/2004 | Isaji ......................... G01S 7/40 342/173 |
| 7,209,074 | B2 | * | 4/2007 | Taylor ................... G01S 7/4008 342/128 |
| 7,427,946 | B2 | * | 9/2008 | Ando .................... G01S 7/4017 342/173 |

FOREIGN PATENT DOCUMENTS

| | | |
|---|---|---|
| EP | 1141744 A1 | 9/2003 |
| JP | 2004171402 A | 6/2004 |
| JP | 2008032495 A | 2/2008 |

* cited by examiner

Fig. 1

(PRIOR ART)

(PRIOR ART)

RADAR DEVICE AND A METHOD FOR DETECTING A MALFUNCTION OF A RECEIVER CHANNEL OF A RADAR DEVICE

CROSS REFERENCE

This application claims priority to International Application Number PCT/EP2012/073201, filed Nov. 21, 2012, which claims priority to German Patent Application No. 10 2011 055693.1, filed Nov. 24, 2011. Both of these documents are hereby incorporated by reference.

FIELD OF THE INVENTION

The invention relates to a radar device for transmitting and receiving a signal in a frequency band for target detection. The invention includes a control means, an oscillator, with an input of the oscillator being connected via a converter to the control means, with it being able to address the oscillator via control means in order to generate a signal, and with it being possible to tap the signal generated via the oscillator at an output of the oscillator, at least one transmission antenna for transmitting the signals provided at the output of the oscillator, with the transmission antenna being connected to the output of the oscillator, and at least one receiver channel for receiving a receiver signal, for processing the receiver signal, and for forwarding the processed receiver signal to the control means, with the receiver channel comprising at least one receiving antenna for receiving the receiver signal and a mixer for mixing the receiver signal with the signal provided at the output of the oscillator, and with the mixer being connected to the output of the oscillator.

BACKGROUND

Such a radar device is known from the patent publication DE 100 50 278 B4. It can be used to determine, via a LFMSK-transmission method, the distance and/or relative speed of a vehicle in reference to an object. The abbreviation here represents Linear Frequency Modulated Shift Keying.

Figure 1:
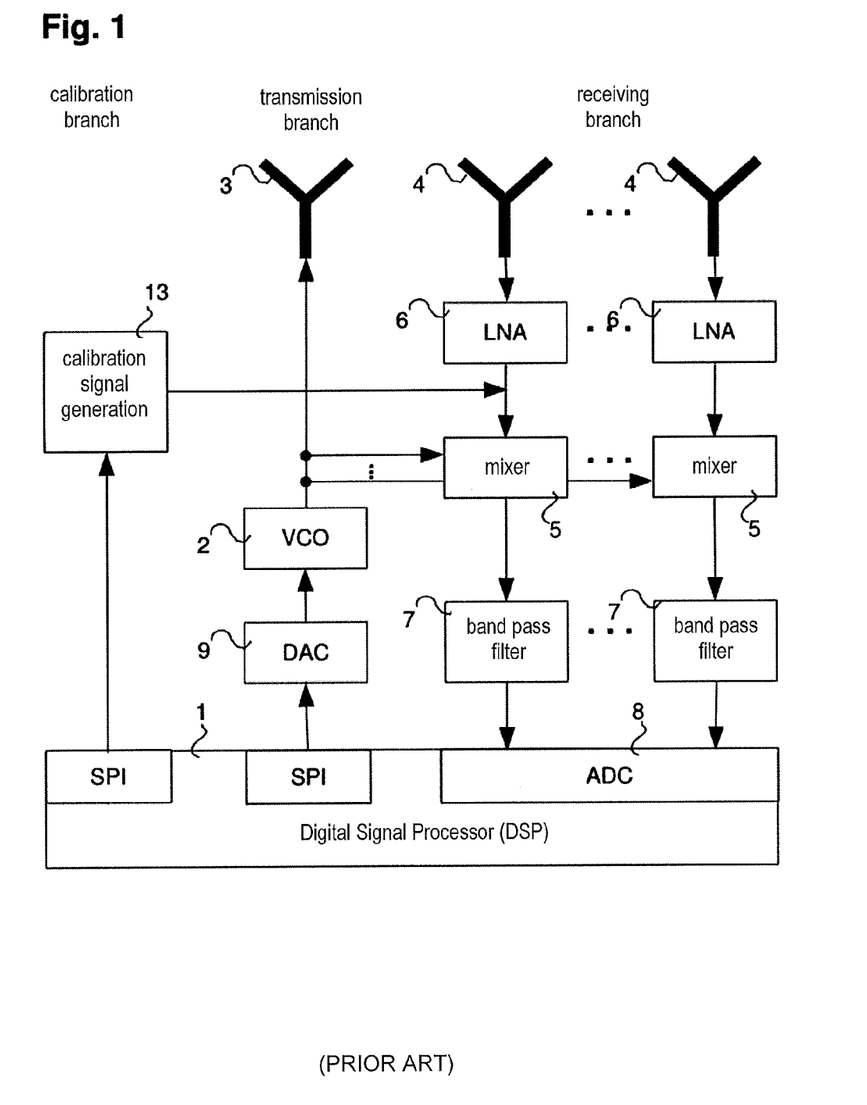
FIG. 1 is a schematic illustration of a radar device according to prior art.
Figure 2:
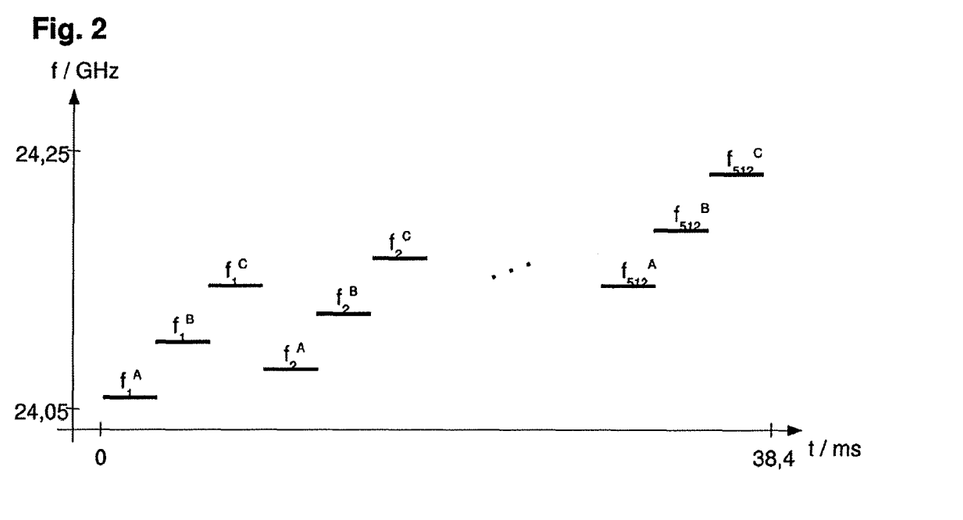
FIG. 2 is a signal process in a method according to prior art.

A radar device with the above-mentioned features of the applicant is explained in greater detail based on prior art FIGS. 1 and 2.

FIG. 1 shows the control means 1, the oscillator 2, transmission antenna 3, the receiving antenna 4, and the mixer 5.

The control means can address the oscillator 2. For this purpose, an output of the control means 1 is connected to a digital-analog converter 9, which converts a predetermined digital value into an analog voltage.

By addressing the oscillator 2 via the control means 1 said oscillator 2 can generate the signal such that it shows different signal portions A, B, C, . . . . Each signal portion A, B, C, . . . of the signal shows a sequence of signal fragments $A_i$, $B_i$, $C_i$, . . . . First signal fragments $A_1$, $B_1$, $C_1$, . . . of the various signal portions A, B, C, . . . of the signal show different frequencies $f_1^A$, $f_1^B$, $f_1^C$, . . . and follow each other. The first signal fragments $A_1$, $B_1$, $C_1$, . . . are followed by additional signal fragments $A_i$, $B_i$, $C_i$, . . . of the signal portion A, B, C, . . . of the signal, which also follow each other.

The frequency $f_i^A$, $f_i^B$, $f_i^C$, . . . of the signal fragments $A_i$, $B_i$, $C_i$, . . . of a signal portion A, B, C, . . . of the signals increases during one cycle either from one signal fragment to the next signal fragment by one frequency increment $\Delta f$ or decreases during the cycle from one signal fragment to the next signal fragment by the frequency increment $\Delta f$. It is also possible for the frequency $f_i^A$, $f_i^B$, $f_i^C$, . . . of the signal fragments $A_i$, $B_i$, $C_i$, . . . of a signal portion A, B, C, . . . to remain steady during a cycle.

The signal fragments, also called bursts, show for example a length of 25 µs. The frequency $f_i^A$, $f_i^B$, $f_i^C$, . . . within a signal fragment $A_i$, $B_i$, $C_i$, . . . of an arbitrary signal portion A, B, C, . . . of the signal is constant and during a cycle, based on a frequency $f_0^A$, $f_0^B$, $f_0^C$, . . . of a signal fragment $A_0$, $B_0$, $C_0$, . . . of a single portion A, B, C, . . . it can be increased or reduced to the next signal fragment $A_1$, $B_1$, $C_1$, . . . of the same signal portion A, B, C, . . . of the signal by a preferably fixed frequency increment $\Delta f$ or remain steady. Therefore, e. g. it results for the signal portion A: $f_i^A = f_0^A + i \cdot \Delta f$ with $i=1, \ldots, N-1$. A typical value for N, i.e. for the number of signal fragments $A_i$, $B_i$, $C_i$, . . . of a signal portion A, B, C, . . . per cycle is 512. Depending on the frequency of the signal fragments within a cycle being increased or reduced, i.e. represents, $\Delta f > 0$, $\Delta f < 0$ or $\Delta f = 0$, a cycle is also called upchirp, downchirp, or Doppler chirp. Upchirps, downchirps, and/or Doppler chirps are preferably transmitted alternating.

The different signal portions A, B, C, . . . of the signal are nested, i.e. here the signal fragments $A_i$, $B_i$, $C_i$, . . . of the various signal portions A, B, C, . . . follow each other in a preferably fixed sequence, as shown in FIG. 2 for an upchirp . The frequencies of the first signal fragments A, B, C, . . . of the various signal portions A, B, C, . . . are distinguished from each other by a difference which is very small in reference to the frequencies. The frequency increments $\Delta f$ are also very small in reference to the frequencies of the various signal portions A, B, C, . . . , when they are above or below zero.

The frequency range of a cycle of 38.4 ms, respectively swept through by the signals A, B, or C, typically amounts to 90 MHz. The frequency differences $f_i^B - f_i^A$ and/or $f_i^C - f_i^B$ each amount to approximately 1.2 MHz. The selection of these parameters, in addition to statutory stipulations of the covered band width of the allocated frequency band, is primarily determined by the requirements of the target detection, which shall occur by the radar device.

The signal generated by the oscillator 2 is transmitted by the transmitting antenna 3.

The signal transmitted by the transmitting antenna 3 may be reflected by one or more targets, and the reflections, generally mixed with signals of other sources, can be received by at least two receiving antennas 4. The signals received by the receiving antennas 4 are called receiver signals. The receiver signals are first amplified with an amplifier 6 and mixed in the mixer 5 with the signal at the output of the oscillator 2 such that wavelets develop, which show a frequency portion in the basic band. From the wavelets, which are filtered via a band pass filter 7, the distance and the relative speed of a target, which cause a reflection, are determined in the control means 1, particularly from a Doppler shift and phasing, as disclosed in the patent publication DE 100 50 278 B4. For this purpose, the wavelets are digitized at the input of the control means via an analog-digital converter 8.

Based on delay times at the two receiver antennas 4 the incident angle of the reflections can be determined. The information gathered this way and additional information can then be forwarded to another processing step.

Between the cycles in which during operation of an above-mentioned radar device upchirps, downchirps, or Doppler chirps are transmitted, at certain intervals so-called calibration cycles are inserted. The calibration cycles have essentially two objectives:

the compensation of a frequency drift of the 24 GHz-mixer: Generally, a voltage controlled oscillator (VCO) 5 is used, in which a frequency drift may occur, primarily caused by the abrupt change of temperature during operation, but also by other effects, such as for example load pulling or aging. The compensation of the frequency drift is required in order to avoid by all means that any respectively predetermined statutory frequency band limits are exceeded (cut-off frequency). The compensation occurs in every calibration cycle by an adjustment of the range of settings of the voltage controlled oscillator and/or a value respectively predetermined by the control means, by which the voltage controlled oscillator is adjusted.

The compensation of the non-linearity of the characteristic of the voltage controlled oscillator: The LFMSK-transmission process provides for a nested transmission of the three signal portions A, B, and C according to FIG. 2, with each of the three signal portions showing a frequency progression with equidistant frequency levels. Upholding these constant distances between two neighboring frequencies of a signal portion is of eminent importance for the target directive. Based on the non-linearity of the characteristic of the voltage controlled oscillator (frequency via adjusted voltage) for the setting of equidistant frequency levels here non-equidistant adjustment voltages develop and/or non-equidistant values predetermined by the control means for the digital-analog converter. They must be newly calculated in every calibration cycle for each of the transmission frequencies to be adjusted, because the progression of the characteristic of the voltage controlled oscillator depends on many factors, such as temperature, load pulling or aging, and thus permanently changes during operation.

The calibration of the voltage controlled oscillator occurs in the radar device of the applicant via a calibration signal generated in the control means 1, which is supplied to a mixer 5 instead of a receiver signal. The calibration signal is mixed with the signal generated by the voltage controlled oscillator 2 in the mixer 5. The mixed signal is then forwarded via the receiver channel to the control means 1 and used for calibrating the voltage controlled oscillator 2.

In addition to a calibration, with the radar device of the applicant shown in FIG. 1 the detection of a malfunction of a receiver channel of the radar devices is also possible. The detection of a malfunction is possible during operation, i.e. during the upchirps, the downchirps, or the Doppler chirps.

The high frequency signal received by the receiver antenna 4, which shows the reflections of the transmitted signal of objects to be detected in the environment of the radar device, is supplied via an amplifier 6 to the mixer 5. Here, by the (coherent) mixing with the signal generated by the voltage controlled oscillator 2 a basic band signal develops, with the progression of its amplitude in an ideal mixer exclusively being determined by the phasing of the receiver signal in reference to the signal generated by the voltage controlled oscillator. However, the output signal of a real mixer 5 includes, in addition to the above-mentioned mixing product, also a so-called parasitic portion, which is also called mixer bias.

This mixer bias is dependent on the absolute frequency of the signal generated by the voltage controlled oscillator at 24 GHz. In the frequency band used showing 100 MHz and/or 200 MHz, approximately a linear dependency can be assumed. The precise parameters of this dependency are different, though, from one mixer 5 to the next mixer 5 due to parts and soldering tolerances of the high-frequency components, particularly the mixer diodes, being arbitrary and variable both quantitatively as well as qualitatively.

Due to the fact that the dynamic of the mixer bias in the output signals of the mixers of the receiver channels can be considerable without additional measures and might lead to a relevant worsening of the target detection, the analog filtering following in the mixer is not only designed as a low pass filter for limiting the noise but also as a band pass filter 7, in order to dampen the low-frequency mixer bias in the receiver signal. However, the damped portion of the mixer bias is present in the receiver signals and in this form it is the basis for detecting a channel failure. This detection occurs digitally, because the output signal of the band pass filter is already converted from analog to digital by an analog-digital converter 8 for the other signal processing means at a resolution of 12 Bit.

The option known to the applicant of detecting a channel failure comprises here to estimate the mixer bias, which due to its low frequency changes only very slowly over time, using an adaptive algorithm. When this algorithm yields an expected signal portion, it can be assumed that the portion of the receiver channel operates without malfunctions from the mixer 5 to the analog-digital converter 8. However, if no expected signal portions are provided, here a malfunction of a channel is very probable, for example by an interrupted contact or a defective part between the mixer 5 and the analog-digital converter 8.

The detection of a channel failure requires storage and computing capacities of the control means 1, which must be provided in addition to the storage and computing capacities of the control means 1 for target detection because the detection of a channel failure occurs during target detection. This can be considered disadvantageous.

Further, the target detection in the frequency ranges of the mixer bias required a strong damping of the basic band signal in the receiver channels. This is counter productive for detecting a channel failure, because the mixer bias is here damped to such an extent that a functional receiver channel can erroneously be detected as being defective.

SUMMARY OF THE INVENTION

The present invention was based on the objective to suggest a radar device, by which the detection of a channel failure is possible, which requires no additional storage or computing capacities, and in which the detection of a channel failure can occur regardless of any measures for detecting a target.

This objective is attained according to the invention such that the output of the oscillator is connected to the input of the control means and that the control means is suitable and provided to address the oscillator in order to generate first signal portions for the purpose of detecting a channel failure, which show signal fragments, with their frequencies being equivalent to a lower cut-off frequency of the frequency band and an upper cut-off frequency of a frequency band, with it being possible that the signal fragments with the lower cut-off frequency and the signal fragments with the upper cut-off frequency can be generated alternating. From the selection of the frequencies of the signal fragments the term cut-off frequency mode is deducted for an operation of the radar device according to the invention.

The objective is further attained according to the invention such that the output of the oscillator is connected to an input of the control means and that the control means is suitable and embodied to address the oscillator for the purpose of detecting a channel failure in order to generate first signal portions, which show signal fragments with their frequencies being within the frequency band, with here the frequency of two successive signal fragments differing by more than 4 MHz. The signal fragments may show frequencies, which are used as support frequencies for calibrating the oscillator. The title of support frequency mode is deducted from the selection of the frequencies of the signal fragments for an operation of the radar device according to the invention.

A radar device according to the invention may be operated in the cut-off frequency mode or in the support frequency mode.

The control means of the radar device according to the invention is advantageously suitable and embodied that it uses the first signal portion generated for the purpose of detecting a channel failure also for calibrating the oscillator in order to generate signals transmitted via the transmission antenna. For this purpose, the output of the oscillator is returned to the control means. The output signal of the oscillator can therefore be processed in the control means in order to determine the characteristic of the oscillator and perhaps, by way of adjusting the voltage emitted by the control device, adjust it with regards to a desired progression.

For example, a frequency counting method is used for calibrating the oscillator, which allows the adjustment of several frequencies in the 24 GHz-band, with it being required that each individual frequency is kept constant over a period of approximately one millisecond. During this period, an efficient counting occurs of the respective frequency in the 24 GHz-band equivalent to the voltages. For the calibration, here an adjustment and a subsequent counting of several so-called support frequencies, distributed over the frequency band, are necessary within one calibration cycle.

The temporal arrangement of the support frequencies itself is irrelevant for the calibration. However, it allows that the support frequencies can be used for detecting the channel failure and/or the signal fragments of the first signal portion, which are transmitted for detecting a channel failure, are used as support frequencies.

The goal of a suitable sequence of the signal fragments is an excitation of the receiver channels as strong as possible. This can occur either by a reflection of the (transmitted) frequency shift between two signal fragments of the signal portion transmitted to detect a channel failure to objects in the environment of the radar device (case 1) or, if no objects are present in the environment of the radar device, by different amplitudes of the mixer bias due to the various signal fragments of the signal portion transmitted to detect the channel failure (case 2).

While case 1 sets no particular requirements to the sequence of frequencies of the signal fragments of the signal portion transmitted to detect the channel failure, in the second case sufficiently large frequency shifts must occur so that in the mixer bias sufficiently large amplitudes can be detected, i.e. sufficiently large dynamics are given in the mixer bias. Due to the fact that for typical transmission band widths of 100 MHz or 200 MHz an approximately linear progression exists between the amplitude of the mixer bias of a channel and the absolute frequency at 24 GHz, shifts between chronological signal fragments are desired as large as possible during one cycle in order to detect a channel failure and/or for calibration. Large shifts between chronological signal fragments during a cycle can be achieved by radar devices according to claim 1 and/or radar devices according to claim 2.

The radar device according to claim 1 allows the detection of a channel failure and a calibration of the oscillator typically in a start-up phase of the radar device. The radar device and particularly the control means of the radar device are then embodied such that initially estimated voltage values are set for the upper and lower cut-off frequencies of the transmission frequency band. The frequency counting method allows measuring the frequencies in the transmission frequency band according to the voltages set. Voltages for all desired frequencies within the frequency band can be approximated by interpolation or extrapolation. For the purpose of detecting malfunctioning channels the upper and the lower cut-off frequencies are transmitted preferably as an alternating sequence of 20 signal fragments. This ensures an excitation of the receiver channels with 19 frequency shifts of maximally permitted height.

The radar device with the features according to claim 2 allows with regards to the calibration of the oscillator that the estimated voltage values for the frequencies are adjusted between the upper and the lower cut-off frequencies at the oscillator using the control means. Here too, the frequency of the signal fragments generated by the oscillator is measured by the frequency counting method. Using a regression of the measuring points, the detection of the characteristic of the oscillator can be achieved with the control means, allowing a compensation of the non-linearity of the characteristic of the oscillator. With regards to the detection of a malfunctioning channel an adequate frequency sequence is also selected in the radar device according to claim 2. For example, 21 frequencies of the signal fragments, evenly distributed over the transmission frequency band, can allow an excitation of the receiver channels with frequency shifts which are considerably higher than the frequency shifts developing during the cycles in which a target detection occurs.

The radar device according to the invention can be suitable and embodied for the purpose of target detection, with here the control means addressing the oscillator such
  that the signal can be generated so that it shows at least one additional signal portion,
  that each additional signal portion of the signal shows a sequence of signal fragments,
  that first signal fragments of various additional signal portions of the signal show different frequencies and follow each other, and
  that after the first signal fragments additional signal fragments follow successively after the various other signal portions, and
  that the frequency of the signal fragments of another signal portion of the signal during one cycle remains steady, increases during a cycle from one signal fragment to another signal fragment by one frequency increment, or reduces during a cycle from one signal fragment to another signal fragment by one frequency increment.

The control means of a radar device according to the invention can be suitable and embodied to evaluate, after the transmission of the first signal portion, the receiver signal processed in the receiver channel and forwarded to the control means, in order to detect a malfunction of a receiver channel.

The control means can further be suitable and embodied, in order to evaluate the receiver signal forwarded to the control means, for determining a mean value of the receiver signal, forwarded to the control means during a time interval, and minimum and maximum values of the receiver signal forwarded to the control means during a time interval to the receiver signal, forwarded to the control means. The control means can be suitable and embodied, in order to evaluate the receiver signal forwarded to the control means, for comparing the mean value and the minimum value and the maximum value with each other and/or with predetermined values, and particularly for forming differences between the mean value, the minimum value, and/or the maximum value, and for comparing them with predetermined values. This can be a first way to detect high dynamics of the mixer bias in the receiver signal.

The control means can be suitable and embodied, in order to evaluate the receiver signal forwarded to the control means, for determining and analyzing shifts in the receiver signal forwarded to the control means at predetermined points of time during the transmission of the first signal portion. The predetermined points of time may be times, at which frequency shifts are given in the signal generated by the oscillator. This may be a second way to determine high dynamics of the mixer bias in the receiver signal.

The control device of a radar device according to the invention can be suitable and embodied, for evaluating the receiver signal forwarded to the control means, for determining and analyzing the frequency spectrum of the receiver signal forwarded to the control means during the transmission of the first signal portion. This may be a third way to detect high dynamics of the mixer bias in the receiver signal.

Other ways to determine high dynamics of the mixer bias in the receiver signal are possible for detecting a channel failure. They may show parts of the above-shown ways.

The determination and analysis of the forwarded receiver signal and particularly the mixer bias in the forwarded receiver signal can then occur temporarily offset in reference to the target detection so that the same resources, particularly the same storage and computing resources of the control device, can be used for the detection of a malfunction of one of the receiver channels and for target detection.

In order to detect a malfunction of a receiver channel of a radar device, it may occur that repeatedly the control means addresses the oscillator in order to generate a first signal portion and evaluates the receiver signal, processed in the receiver channel and forwarded to the control means, for the purpose of detecting a channel failure of one of the receiver channels. The control means can detect a channel failure when a mixer bias of the receiver signal, forwarded to the control means, shows very low dynamics during the transmission of a first signal section.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

Figure 3:
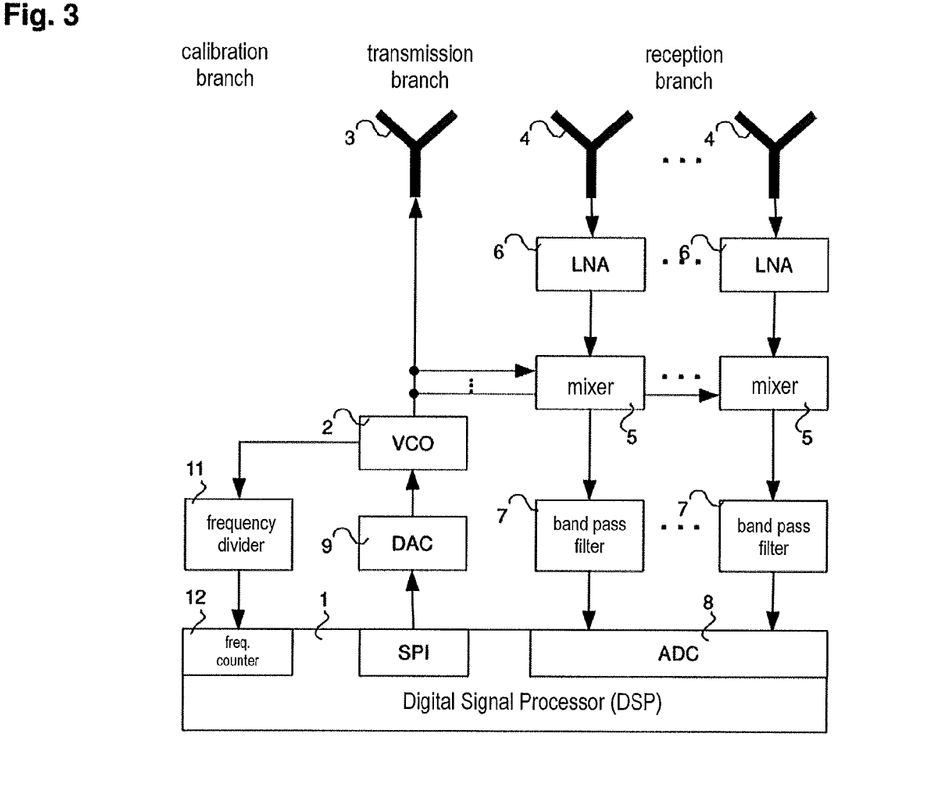
FIG. 3 is a schematic illustration of a radar device according to the invention.

The radar device according to the invention shown in FIG. 3 shows largely identical features to the radar device shown in FIG. 1, therefore initially reference is made to the description of the radar device according to FIG. 1. The radar device according to FIG. 3 differs essentially in a modified control means 1, which is embodied according to the invention. Here, the control means 1 shows a frequency counter 12, which enables the radar device to measure the frequency at the output of the oscillator 2 according to the frequency counting method. A frequency splitter 11 is arranged upstream of the frequency counter 12, which may be omitted depending on the embodiment of the frequency counter 12. Due to the fact that the calibration occurs by the frequency counter and the output signal of the oscillator 2, the transmission of a calibration signal from the control means to the receiver channel is not necessary, as shown in the radar device according to FIG. 1.

The radar device according to the invention shown in FIG. 3 is capable, both in the cut-off frequency mode (FIG. 4) as well as in the support frequency mode (FIG. 5) to generate first signal portions, which on the one side are used for calibrating the oscillator 2 of the radar device and on the other side allow the detection of a channel failure of a receiver channel.

Figure 4:
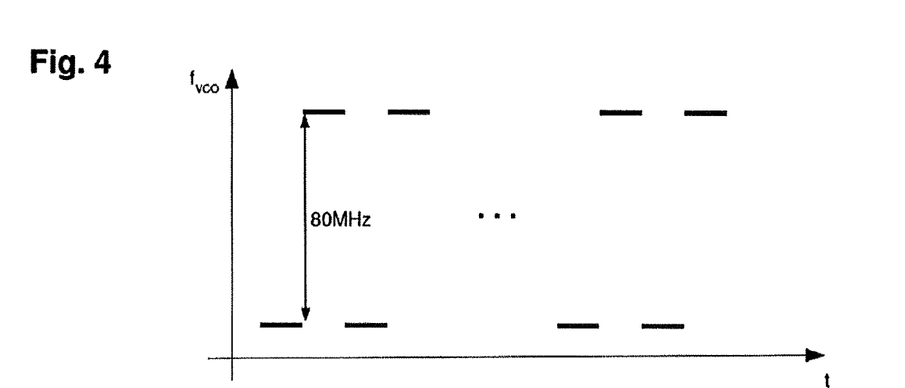
FIG. 4 is a signal progression in the cut-off frequency mode.

The first signal portion shown in FIG. 4 comprises several signal fragments. The signal fragments show a frequency which is either equivalent to the upper cut-off frequency or the lower cut-off frequencies of the frequency band selected for the radar device. The control means 1 controls the oscillator 2 with an interposed digital-analog converter 9 such that the signal fragments with the upper cut-off frequency alternate with the signal fragments with the lower cut-off frequency. The successive signal fragments show a frequency distance of 80 MHz, so that frequency shifts of 80 MHz shall occur during the change from one signal fragment to the subsequent signal fragment. The signal fragments preferably show a length of 1 ms.

Figure 5:
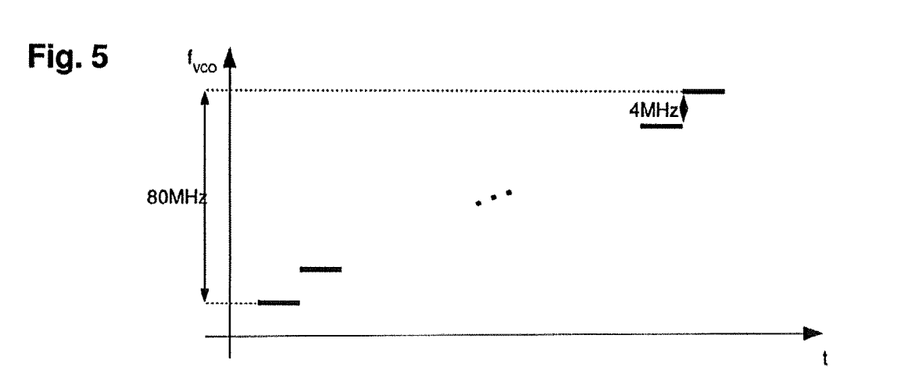
FIG. 5 is a signal progression in the support frequency mode.

The first signal portion shown in FIG. 5 also comprises several signal fragments. The signal fragments show a frequency equivalent to the support frequencies selected for calibration. The control means 1 controls the oscillator 2 with the digital-analog converter 9 being interposed such that the frequency of one signal fragment to another signal fragment increases by at least 4 MHz. Greater frequency shifts are possible when another sequence of the signal fragments is selected. The signal fragments transmitted in the support frequency mode also show a length of preferably 1 ms.

Figure 6:
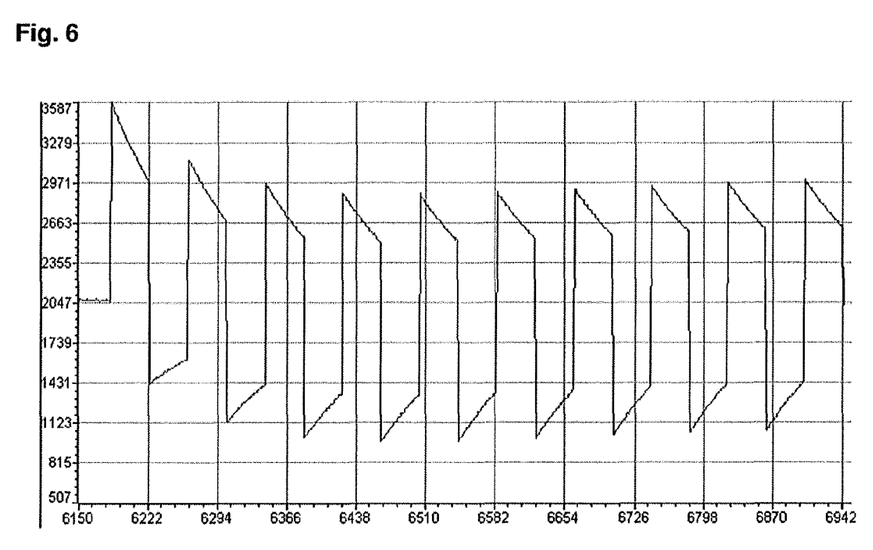
FIG. 6 is a receiver signal forwarded in the cut-off frequency mode to the control means, without any targets in the environment of the radar device.
Figure 7:
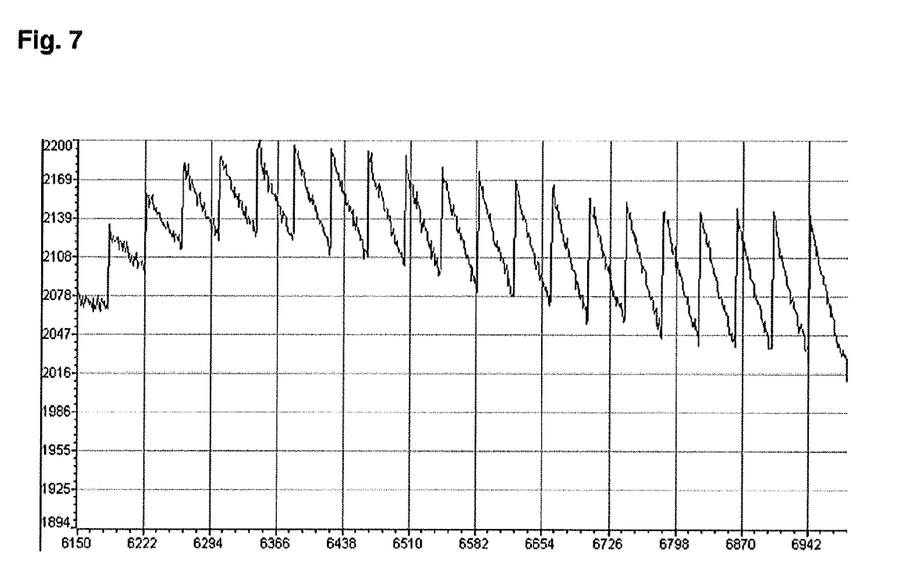
FIG. 7 is a receiver signal forwarded in the support frequency mode to the control means without any targets in the environment of the radar device.

FIGS. 6 and 7 show the received signals repeatedly applied at the control means 1 and processed as measured in a real radar device. Both figures show a signal progression with high dynamics. Here it is possible to distinguish noise, as potentially developing in a defective channel, for the receiver signals according to FIGS. 6 and 7 with very simple and hardly expensive methods and means of signal processing. Accordingly, a very high reliability can be achieved for detecting channels failures.

For example, it is sufficient for a method to detect channel failures to detect the mean value of the signal and its maximum and minimum value over the period shown. The differences between the mean value, the maximum value, and/or the minimum value amount to a multiple of the mean noise amplitude of a defective channel. As soon as a sufficiently large difference has been detected it can be assumed that the monitored receiver channel operates correctly.

For another method to detect a channel failure it is also sufficient to analyze the height of the amplitude during shifts, which occur at known points of time. This analysis can be performed additionally or instead of the above-described process.

Additionally it would be possible to analyze the frequency spectrum of the receiver signal forwarded to the control means, because due to the form of the signal here peaks will develop at known points in the spectrum, for example at 1 kHz and multiples thereof.

LIST OF REFERENCE CHARACTERS

1 Control means
2 Oscillator
3 Transmitting antenna
4 Receiver antenna
5 Mixer
6 Amplifier
7 Band pass filter
8 Analog-digital converter
9 Digital-analog converter
11 Frequency splitter
12 Frequency counter

The invention claimed is:

1. A radar device for transmitting a signal in a frequency band comprising:
    a control means,
    an oscillator, wherein an input of the oscillator being connected via a converter to the control means, wherein the control means addresses the oscillator in order to generate the signal, and wherein the signal generated by the oscillator is tapped at the output of the oscillator,
    at least one transmitting antenna for transmitting the signal provided at the output of the oscillator, wherein the transmitting antenna being connected to the output of the oscillator,
    at least one receiver channel for receiving a receiver signal, processing the receiver signal, and forwarding the processed receiver signal to the control means, wherein the at least one receiver channel comprises at least one receiving antenna and a mixer for mixing the receiver signal with the signal provided at the output of the oscillator, wherein the mixer being connected to the output of the oscillator,
    wherein the output of the oscillator is connected to the input of the control means, and
    wherein the control means addresses the oscillator for the purpose of detecting a malfunctioning channel to generate first signal portions (K), which comprise the signal fragments ($K_i$), with their frequencies ($f_i^k$) showing a lower cut-off frequency ($f_{E1}$) of the frequency band and an upper cut-off frequency ($f_{E2}$) of the frequency band, and
    wherein the control means generates alternating the signal fragments ($K_i$) with the lower cut-off frequency ($f_{E1}$) and the signal fragments ($K_i$) with the upper cut-off frequency ($f_{E2}$).

2. The radar device of claim 1, wherein the output of the oscillator is connected to an input of the control means, and
    wherein the control means addresses the oscillator for the purpose of calibrating the oscillator in order to generate first signal portions, which show signal fragments ($K_i$), with their frequencies ($f_i^k$) being within a frequency band, with the frequencies of two successive signal fragments differing by more than 4 MHz.

3. The radar device according to claim 1 wherein the signal is generated such that it shows at least one additional signal portion (A, B, C, . . . ),
    wherein each additional signal portion (A, B, C, . . . ) of the signal shows a sequence of signal fragments ($A_i$, $B_i$, $C_i$, . . . ),
    wherein first signal fragments ($A_1$, $B_1$, $C_1$, . . . ) of different additional signal portions (A, B, C, . . . ) of the signal show identical or different frequencies ($f_1^A$, $f_1^B$, $f_1^C$ . . . ) and follow successively,
    wherein subsequent to the first signal fragments ($A_1$, $B_1$, $C_1$, . . . ) additional signal fragments ($A_i$, $B_i$, $C_i$, . . . ) of the different additional signal portions (A, B, C, . . . ) follow successively, and
    wherein the frequency ($f_1^A$, $f_1^B$, $f_1^C$ . . . ) of the signal fragments ($A_i$, $B_i$, $C_i$, . . . ) of another signal portion (A, B, C, . . . ) of the signal remains steady during one cycle, increases evenly during a cycle from one signal fragment ($A_i$, $B_i$, $C_i$, . . . ) to another signal fragment ($A_{i+1}$, $B_{i+1}$, $C_{i+1}$, . . . ) by one frequency increment ($\Delta f$) each, or lowers during the cycle from one signal fragment to another signal fragment by the frequency increment ($\Delta f$).

4. The radar device according to claim 1 wherein the control means, after the transmission of the first signal portions, processes the receiver signal processed in the at least one receiver channel and forwarded to the control means for detecting a malfunction of the receiver channel.

5. The radar device according to claim 4, wherein the control means, in order to process a receiver signal forwarded to the control means, determines a mean value of the receiver signal forwarded to the control means during a time period and minimum and maximum values of the receiver signal forwarded to the control means.

6. The radar device according to claim 5, wherein the control means, in order to process the receiver signal forwarded to the control means, compares the mean value and the minimum value and the maximum value with at least one of each other and with predetermined values, forms differences between at least one of the mean value, the minimum value, and the maximum value, and compares them to predetermined values.

7. The radar device according to claim 5 wherein the control means, in order to process the receiver signal forwarded to the control means, determines and analyzes leaps in the receiver signal forwarded to the control means at predetermined points of time during the transmission of the first signal portion.

8. The radar device according to claim 5 wherein the control means, in order to process the receiver signal forwarded to the control means, to determines and analyzes the frequency spectrum during the transmission of the first signal portion.

9. The radar device according to claim 8, wherein repeatedly the control means addresses the oscillator in order to generate a first signal portion and the receiver signal processed in the receiver channel and forwarded to the control means for the purpose of detecting a channel failure of one of the receiver channels.

10. The radar device according to claim 9, wherein the control means detects a malfunction of a channel when the receiver signal forwarded to the control means shows dynamics during the transmission of a first signal section.

\* \* \* \* \*